United States Patent
Dietrich (10) Patent No.: US 9,642,308 B2
(45) Date of Patent: May 9, 2017

(54) CROP LIFTER WITH ANGLE AND FINGER ADJUSTMENT

(71) Applicant: Dave Dietrich, Assiniboia (CA)

(72) Inventor: Dave Dietrich, Assiniboia (CA)

(*) Notice: Subject to any disclaimer, the term of this patent is extended or adjusted under 35 U.S.C. 154(b) by 0 days.

(21) Appl. No.: 14/787,576

(22) PCT Filed: Apr. 28, 2014

(86) PCT No.: PCT/CA2014/000384
§ 371 (c)(1),
(2) Date: Oct. 28, 2015

(87) PCT Pub. No.: WO2014/176675
PCT Pub. Date: Nov. 6, 2014

(65) Prior Publication Data
US 2016/0150731 A1    Jun. 2, 2016

(30) Foreign Application Priority Data
May 1, 2013   (CA) ..................................... 2814429

(51) Int. Cl.
*A01D 65/02*  (2006.01)
*A01D 65/00*  (2006.01)

(52) U.S. Cl.
CPC ............. *A01D 65/02* (2013.01); *A01D 65/00* (2013.01)

(58) Field of Classification Search
CPC ........ A01D 65/02; A01D 65/00; A01D 34/18; A01D 65/06

(Continued)

(56) References Cited

U.S. PATENT DOCUMENTS

| 334,374 A | * | 1/1886 | Hamilton | A01D 65/02 56/312 |
| 661,216 A | * | 11/1900 | Johnson | A01D 65/02 56/312 |

(Continued)

FOREIGN PATENT DOCUMENTS

| CA | 2714719 | 3/2012 |
| WO | WO 2013/020208 | 2/2013 |

OTHER PUBLICATIONS

International Search Report for PCT/CA2014/000384 mailed Jul. 17, 2014, three (3) pages.

(Continued)

*Primary Examiner* — John G Weiss
(74) *Attorney, Agent, or Firm* — Nixon & Vanderhye P.C.

(57) ABSTRACT

A crop lifter apparatus has a bracket for attachment to a header guard finger. A cylindrical groove in a front portion of the mounting bracket has an axis perpendicular to a travel direction and a lock bolt hole is defined through the mounting bracket at the groove. The rear of a finger support member has a cylindrical wall engaged in the groove, and defines a cylindrical lock aperture with an axis coincidental with the axis of the groove. A slot in the rear of the support member is oriented perpendicular to the axis of the lock aperture. A lock cylinder is engaged in the lock aperture and a lock bolt extends through the lock bolt hole and the slot and into the lock cylinder and is tightened to secure the support member to the mounting bracket at a selected finger angle. A length of the lifting finger may be adjustable.

10 Claims, 5 Drawing Sheets

(58) Field of Classification Search
USPC .................................................. 56/312, 313
See application file for complete search history.

(56) References Cited

U.S. PATENT DOCUMENTS

| | | | | |
|---|---|---|---|---|
| 723,084 | A * | 3/1903 | Vollborn | A01D 65/02 |
| | | | | 56/312 |
| 1,073,979 | A * | 9/1913 | Graney | A01D 65/02 |
| | | | | 56/313 |
| 2,141,299 | A | 12/1938 | Hume et al. | |
| 2,294,646 | A * | 9/1942 | Young | A01D 65/02 |
| | | | | 56/313 |
| 2,552,623 | A * | 5/1951 | Dye | A01D 65/02 |
| | | | | 56/312 |
| 2,746,230 | A * | 5/1956 | Reimer | A01D 65/02 |
| | | | | 56/16.3 |
| 2,960,814 | A * | 11/1960 | Babcock | A01D 65/00 |
| | | | | 56/312 |
| 3,163,975 | A * | 1/1965 | Lightsey | A01D 65/02 |
| | | | | 56/313 |
| 6,691,499 | B2 | 2/2004 | Schumacher et al. | |
| 8,991,145 | B2 * | 3/2015 | Dietrich | A01D 65/02 |
| | | | | 56/312 |
| 2012/0060462 | A1 | 3/2012 | Dietrich | |

OTHER PUBLICATIONS

Written Opinion of the ISA for PCT/CA2014/000384 mailed Jul. 17, 2014, four (4) pages.

* cited by examiner

CROP LIFTER WITH ANGLE AND FINGER ADJUSTMENT

This application is the U.S. national phase of International Application No. PCT/CA2014/000384 filed 28 Apr. 2014 which designated the U.S. and claims priority to CA Patent Application No. 2814429 filed 1 May 2013, the entire contents of each of which are hereby incorporated by reference.

This invention is in the field of cutting headers such as are used in agriculture for cutting crops for harvest and the like, and in particular with crop lifters such as are mounted on such headers to increase crop gathering and retention in the harvesting machine.

BACKGROUND

For various reasons crops sometimes are lying so close to the ground that it is difficult to cut them with a conventional harvest header. Some crops are inherently short, while others may be taller, but are prone to fall down when they reach maturity. Heavy rain, wind, or hail can also cause crop stalks to be lying close to the ground at harvest time.

Typically the knife on cutting headers comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

A conventional knife is a few inches above the ground when the header is in its lowest position, such that very short or downed crop material will pass under the knife and be lost. Many different kinds of "crop lifters", as they have come to be known, have been developed over the last century and more. Typically these crop lifters are attached to the header and/or the forward extending point of the guard finger, and provide an arm of various designs that rides along the ground ahead of the knife. A lifting finger extends at a shallow angle from the front of the arm back and over the knife. As the header moves down the field, the arm rides along the ground and under the downed crop stalks, which then are lifted and pass over the lifting finger to the knife, where they are cut and continue moving onto the header from where they can be passed to the harvester, swather table, or the like.

A problem with providing mounts for attaching crop lifters to harvest headers is that the angle with respect to the ground of the various headers made by different manufacturers is different, and so mounting the crop lifter so that the lifting fingers and skid portions address the ground at a suitable angle is problematic, often requiring providing different mounting brackets for different brands of headers.

U.S. Pat. Nos. 700,029 and 791,022 to Gatermann, U.S. Pat. No. 2,734,332 to Fisher, U.S. Pat. No. 2,892,298 to Chaney, U.S. Pat. No. 2,141,299 to Hume, and U.S. Pat. No. 723,880 to Koch disclose such a crop lifter that is pivotally attached to the header so as to be able to move up and down to follow the ground. The Fisher device floats on the ground, while the others are biased toward the ground by springs. The Hume and Koch lifters include a mechanism for limiting the range of pivotal movement. U.S. Pat. Nos. 4,120,138 and 6,691,499 to Schumacher illustrate a crop lifter that is fixed to the header instead of pivoting, but is made of spring steel so that same may move up and down to follow the ground. The crop lifter shown in Schumacher's U.S. Pat. No. 6,691,499 patent includes a mechanism for incrementally adjusting the downward angle of the crop lifter relative to the header to which it is attached, thus facilitating mounting on headers with different angles.

The above crop lifters include a skid portion that rests on the ground during operation and travel along the ground and moves up and down on a pivot axis or bending spring member, and an upper crop lifting finger extending upward and rearward from the skid portion such that the skid portion runs on the ground under the straws and then the straws ride up and back on the finger and are lifted above the knife such that same can be cut and carried back onto the header.

United States Patent Application Number 2012/0060462 of the present inventor Dietrich discloses an alternate type with no skid portion resting on the ground. The crop lifting finger is attached at a fixed adjustable angle to the front of a guard finger, and slopes upward and rearward from the front end thereof. The front end moves along the field slightly above the ground and contact with the ground is only incidental.

The mechanisms of Schumacher U.S. Pat. No. 6,691,499 and Dietrich 2012/0060462 for adjusting the angle of the lifting finger can compensate for different header angles such that the same crop lifter apparatus can be mounted on headers that are mounted at different angles relative to the ground. The angle adjustment can also address bent mounting brackets by adjusting the angle on bent brackets to be the same as on undamaged brackets. It may also be desirable to change the angle to address varying operating conditions.

It is also desirable with some crop conditions, especially with auger type combine headers, to have the crop stalks fall against the forward side of the auger so the fighting on the auger moves the top of the stalks toward the feeding mechanism in the middle of the header, so the crop stalks enter the feeding mechanism head first, improving feeding. With tall upstanding crops this is naturally accomplished however crop stalks that are laying down are typically lifted by the crop lifters only above the knife, and so slide along the header under the auger.

SUMMARY OF THE INVENTION

It is an object of the present invention to provide a crop lifter apparatus that overcomes problems in the prior art.

The present invention provides a crop lifter apparatus for attachment to a harvest header. The apparatus comprises a mounting bracket adapted at a rear portion thereof for attachment to a guard finger of the header. A groove with a cylindrical groove wall is defined in a front portion of the mounting bracket such that an axis of the groove is oriented substantially horizontally and perpendicular to an operating travel direction of the header when the mounting bracket is attached to the header, and a lock bolt hole is defined through the mounting bracket at a middle portion of the groove. A lifting finger support member has a proximate end with a cylindrical outer wall engaged in the groove, and defines a cylindrical lock aperture wherein an axis of the lock aperture substantially coincides with the axis of the groove, and a lifting finger is attached to the lifting finger support member. A slot is defined in the outer wall of the proximate end of the lifting finger support member, the slot oriented substantially perpendicular to the axis of the lock aperture. A lock cylinder is engaged in the lock aperture and has a cylindrical outer wall corresponding to an inner surface of the lock aperture. A lock bolt extends through the lock bolt hole and the slot and is engaged in a threaded hole defined by the lock cylinder and tightened to secure the lifting finger support member to the mounting bracket at a selected finger angle.

The present invention provides a crop lifter apparatus where the angle of the lifting finger with respect to the header to which it is attached can be easily adjusted infinitely within a range and locked to allow same to be mounted to a wide variety of headers, to address a wide variety of crop conditions, and to compensate for bent mounting brackets. The crop lifter of the invention can be either the ground following skid type or the fixed position type.

The length of the lifting finger can also be made adjustable so that when desired crop stalks can be lifted higher and supported farther rearward on the header.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
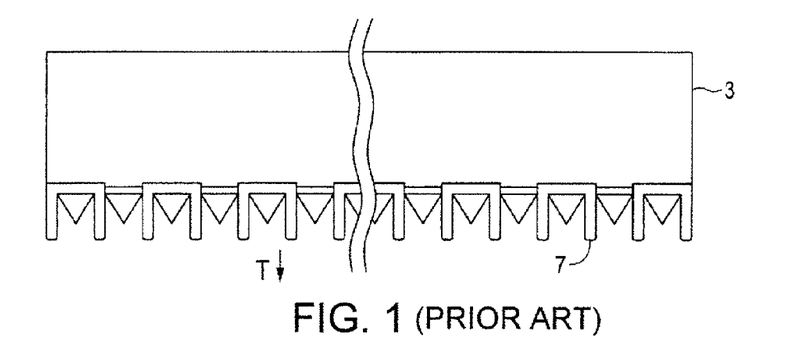
FIG. 1 is a schematic top view of a harvest header of the prior art.
Figure 2:
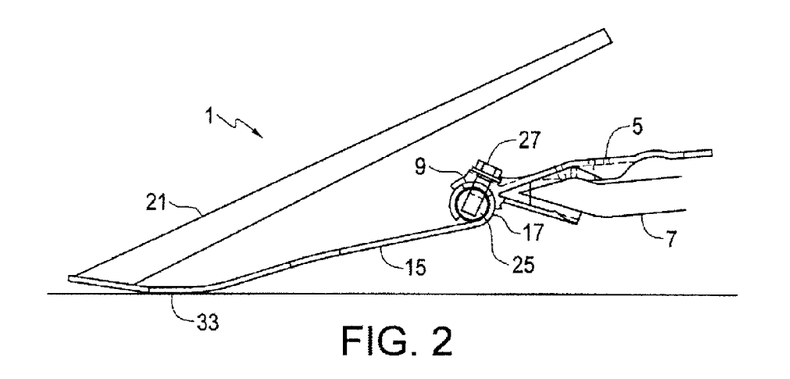
FIG. 2 is a schematic side view of an embodiment of a crop lifter apparatus of the present invention.

FIG. 2 schematically illustrates an embodiment of a crop lifter apparatus 1 of the present invention for attachment to a harvest header 3 such as is schematically illustrated in FIG. 1. The apparatus 1 comprises a mounting bracket 5 adapted at a rear portion thereof for attachment to a guard finger 7 of the header 3. There are various crop lifter attachment mechanisms known in the art and it is contemplated that most would be suitable for attaching the mounting bracket 5 to the guard finger 7.

As further schematically illustrated in FIGS. 4-7, a groove 9 with a cylindrical groove wall is defined in a front portion of the mounting bracket 5 such that the axis GA of the groove 9 is oriented substantially horizontally and perpendicular to an operating travel direction T of the header 3 when the mounting bracket 5 is attached to the header 3. A lock bolt hole 13 is defined through the mounting bracket 5 at a middle portion of the groove 9.

Figures 4, 5:
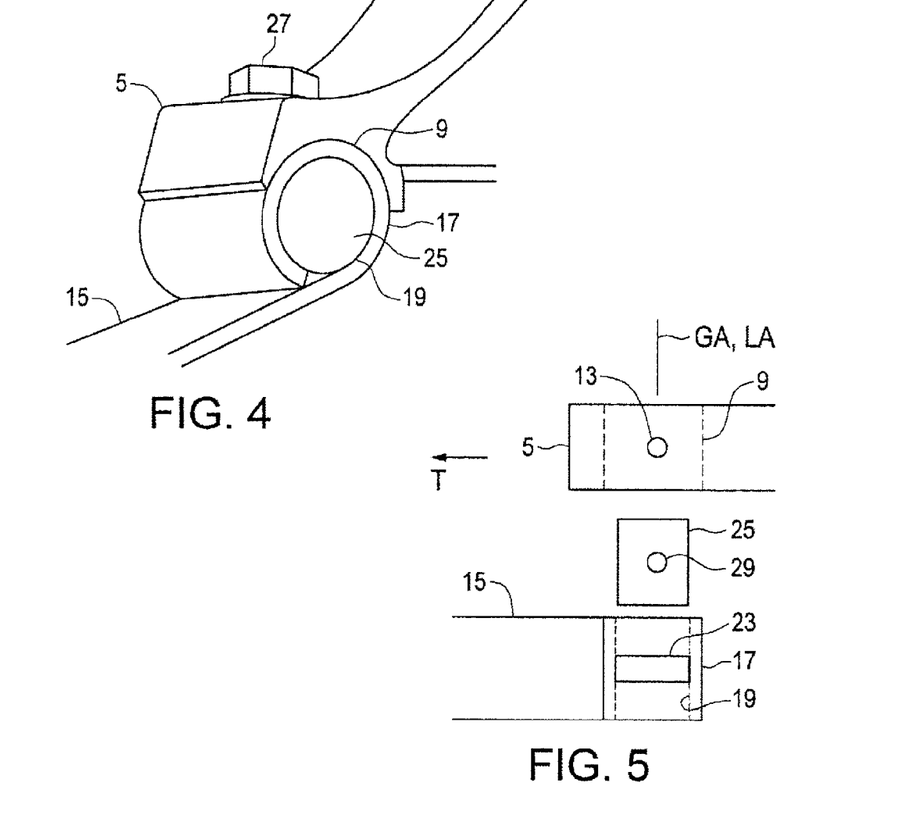
FIG. 4 is a schematic perspective front view of the angle adjustment mechanism of the embodiment of FIG. 2.
FIG. 5 is a schematic exploded top view of the angle adjustment mechanism of the embodiment of FIG. 2.

A lifting finger support member 15 has a proximate end with a cylindrical outer wall 17 engaged in the groove 9, and defines a cylindrical lock aperture 19. The axis LA of the lock aperture substantially coincides with the axis GA of the groove such that the cylindrical outer wall 17 can rotate in the groove 9. A lifting finger 21 is attached to the lifting finger support member 15. As best seen in FIG. 5, a slot 23 is defined in the outer wall 17 of the proximate end of the lifting finger support member 15. The slot 23 is oriented substantially perpendicular to the axis LA of the lock aperture 19.

A lock cylinder 25 is engaged in the lock aperture 19 and has a cylindrical outer wall corresponding to an inner surface of the lock aperture 19. A lock bolt 27 extends through the lock bolt hole 13 and the slot 23 and is engaged in a threaded hole 29 defined by the lock cylinder 25. The lock bolt 27 is tightened to secure the lifting finger support member 15 to the mounting bracket at a selected finger angle. To change the finger angle of the finger 21 with respect to the header 3, the lock bolt 27 may be loosened to allow the lifting finger support member 15 to be moved up and down with the lock bolt 27 moving along the slot 23 as the support member 15 is moved. The apparatus 1 thus provides infinite adjustment of the finger angle, as opposed to incremental adjustment as is common in the prior art.

Figure 12:
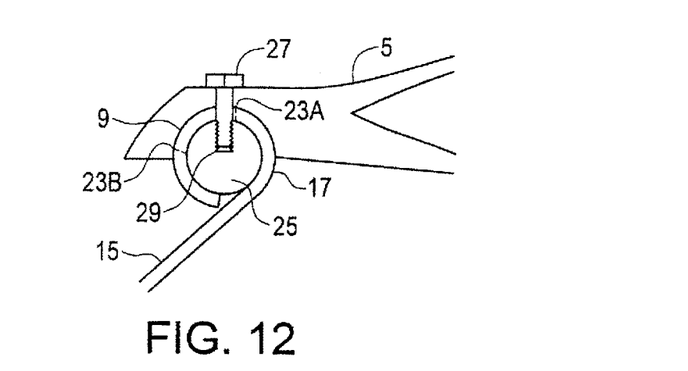
FIG. 12 is a schematic side view of the embodiment of FIG. 2 adjusted to a maximum finger angle.
Figure 13:
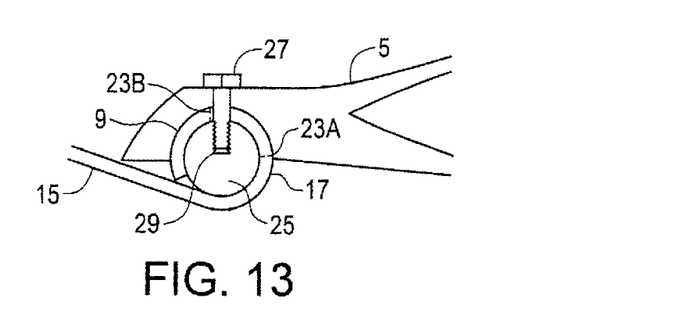
FIG. 13 is a schematic side view of the embodiment of FIG. 2 adjusted to a minimum finger angle.

As illustrated in FIGS. 12 and 13, the selected finger angle is in a range between a maximum selected finger angle shown in FIG. 12 when the lock bolt 27 is at a first end 23A of the slot 23, and a minimum selected finger angle shown in FIG. 13 when the lock bolt 25 is at an opposite second end 23B of the slot 23.

It will be noted as well that the first and second ends 23A, 23B of the slot 23 are entirely within the groove 9 at all selected finger angles, and the slot 23 is the only perforation in the lifting finger support member 15. Rivets or bolts extending through the finger support member create holes that can weaken the member and cause failure. In the illustrated apparatus 1 the only perforation is the slot 23, and the slot 23 is fully hidden and clamped within the groove 9, and so the weakness created by the slot 23 is supported by the lock cylinder 25 clamping the slotted portion of the lifting finger support member 15 against the wall of the groove 9.

Figure 8:
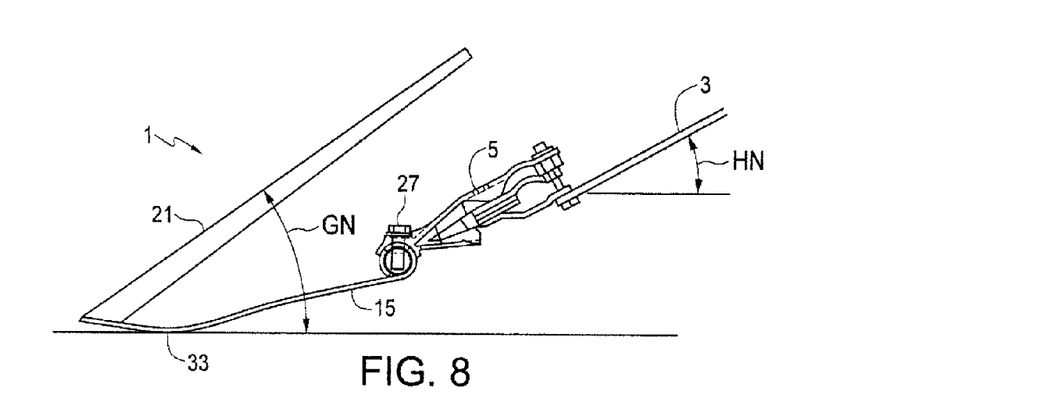
FIGS. 8-10 are side views schematically illustrating the embodiment of FIG. 2 adjusted to provide a constant angle of the lifting finger with respect to the ground when mounted on a variety of headers that oriented at different angles with respect to the ground.
Figure 9:
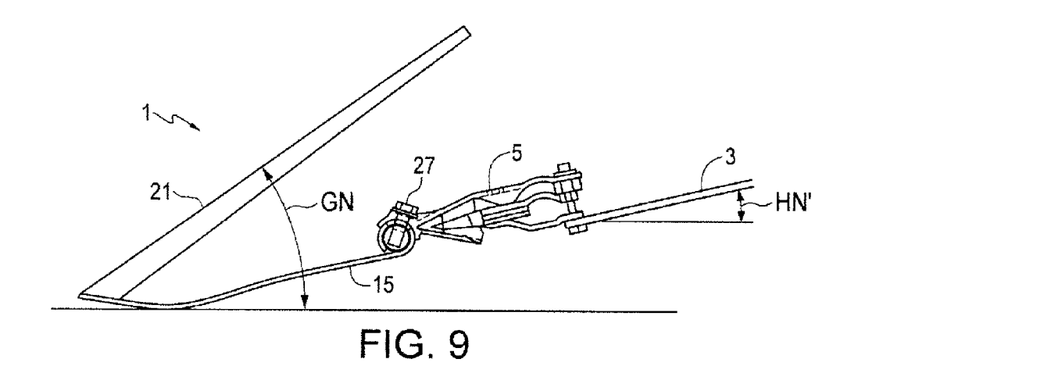
Figure 10:
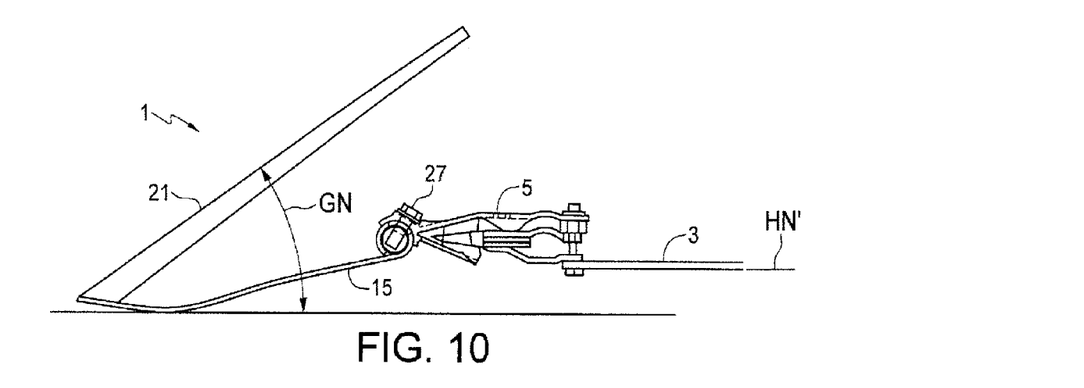

FIGS. 8-10 schematically illustrate how the angle of the finger 21 relative to the header 3 and the mounting bracket 5 attached thereto can be adjusted so that where the angle of the header with respect to the ground changes from a steep angle HN in FIG. 8, to a shallower angle HN' in FIG. 9. to a flat angle HN" in FIG. 10, the angle GN of the finger with respect to the ground can be kept the same.

Figure 6:
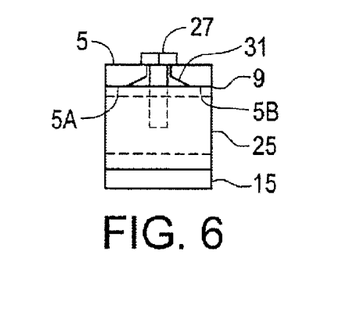
FIG. 6 is a schematic front view of the angle adjustment mechanism of the embodiment of FIG. 2.
Figure 7:
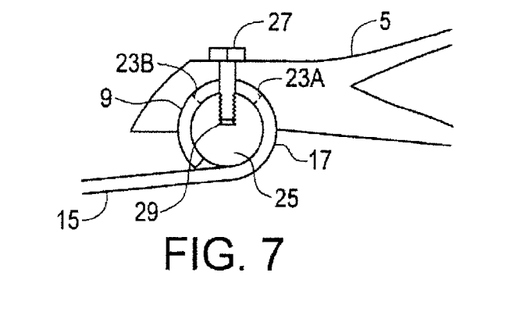
FIG. 7 is a schematic side view of the angle adjustment mechanism of the embodiment of FIG. 2.

FIG. 6 schematically illustrates a recess 31 in the groove 9 adjacent to the lock bolt hole 13 such that outer portions 5A, 5B of mounting bracket 5 adjacent to the recess 31 are forced against the cylindrical outer wall 17 of the proximate end of the support member when the lock bolt is tightened. This arrangement provides a wider area of clamping contact to reduce the occurrence of the lifting finger support member 15 rotating accidentally and changing the finger angle.

In the apparatus 1 of FIGS. 2 and 8-10 is of the around following type well known in the art. The lifting finger support member 15 comprises a flexible spring member extending forward and downward from the groove 9 when the mounting bracket 5 is attached to the header 3, and having a bottom surface 33 adapted to skid along the ground surface. The lifting finger 21 extends upward and rearward from a front portion of the spring member when the mounting bracket is attached to the header 3 as shown in FIGS. 8-10. The proximate end of the spring member is rolled to form the cylindrical outer wall 17 and the cylindrical lock aperture 19.

Figure 3:
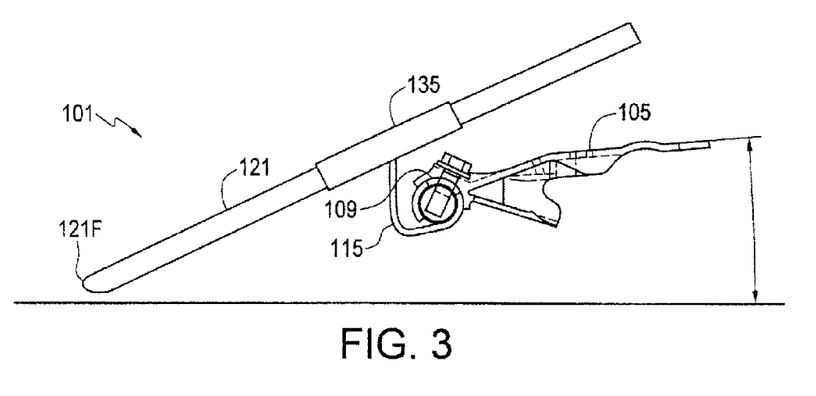
FIG. 3 is a schematic side view of an alternate embodiment of a crop lifter apparatus of the present invention.

FIG. 3 schematically illustrates an alternate crop lifter apparatus 101 of the type where the crop lifting finger 121 is attached at a fixed adjustable angle to the front of the guard finger, and where the front end 121F moves along the field slightly above the ground at a fixed position and contact with the ground is only incidental. In the apparatus 101 the lifting finger support member 115 comprises a finger engagement device 135 at an upper end thereof located above the groove 109 when the mounting bracket 105 is attached to the header. The lifting finger 121 is engaged at a middle portion thereof in the finger engagement device 135 and extends both downward and forward from the finger engaging device 135 and rearward and upward therefrom. The angle of the lifting finger 121 with respect to the mounting bracket 105 is changed in the same manner as described above.

Figure 11:
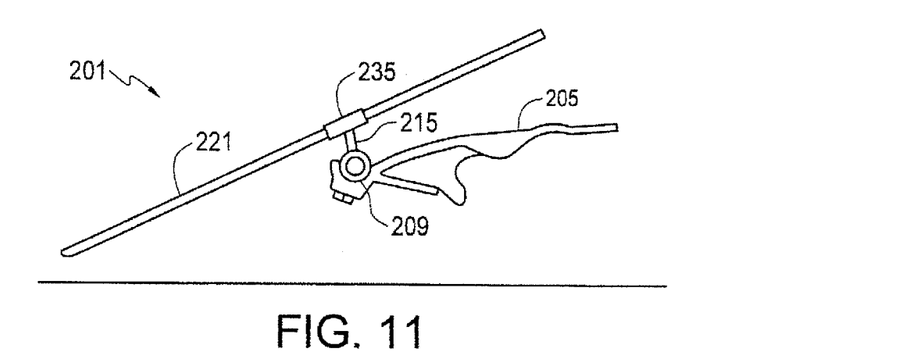
FIG. 11 is a schematic side view of a further alternate embodiment of a crop lifter apparatus of the present invention.

Similarly FIG. 11 schematically illustrates a further alternate crop lifter apparatus 201 of the type shown in FIG. 3, but where the groove 209 in the mounting bracket 205 faces upward instead of downward, such that the lifting finger support member 215 can be quite short.

Figure 14:
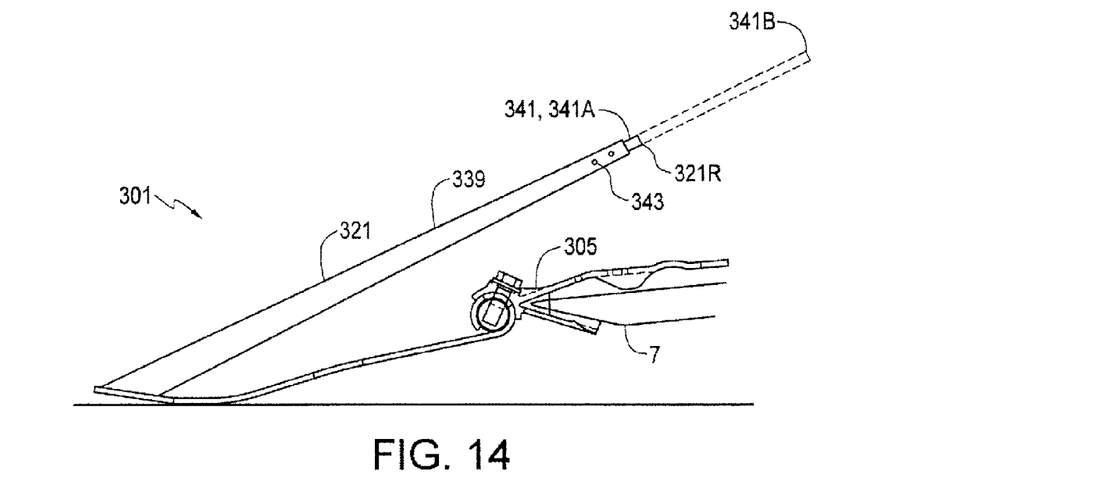
FIG. 14 is a schematic side view of the embodiment of the crop lifter apparatus of FIG. 2 with the addition of a rearwardly extendable lifting finger.
Figure 15:
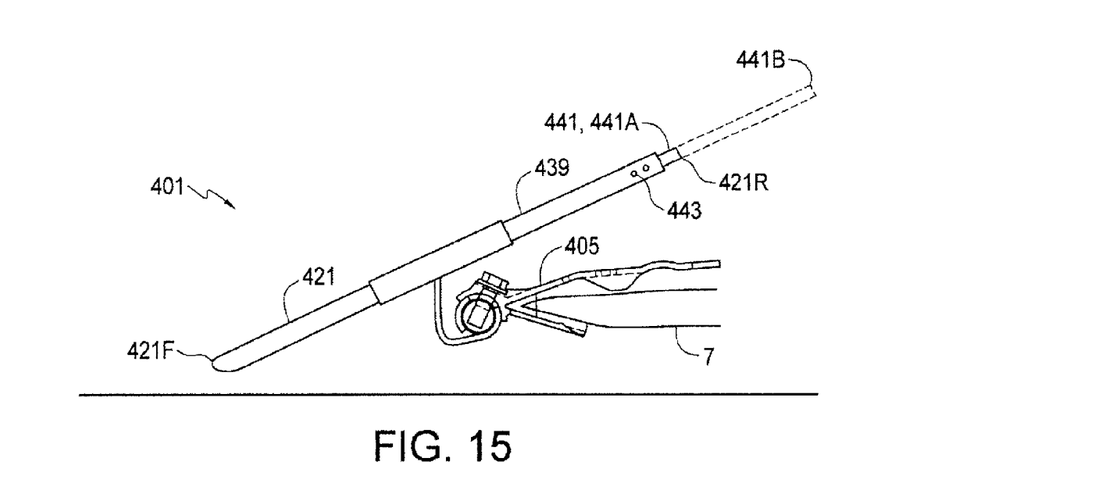
FIG. 15 is a schematic side view of the embodiment of the crop lifter apparatus of FIG. 3 with the addition of a rearwardly extendable lifting finger.

FIGS. 14 and 15 schematically illustrate alternate crop lifter apparatuses 301, 401 wherein the lifting fingers 321, 421 are extendable rearward such that the position of the rear ends 321R, 421R of the lifting fingers 321, 421 with respect to the guard fingers 7 to which the apparatuses are mounted is adjustable, while front ends 321F, 421F of the lifting fingers remain stationary. The front ends 321F, 421F are configured as required to raise downed crop stalks, and so the adjustment at rear ends of the lifting fingers must be independent of the front ends thereof.

FIG. 14 shows a crop lifter apparatus 301 of the ground following type well known in the art and as illustrated in FIGS. 2 and 8-10. A flexible spring member extends forward and downward from the mounting bracket 305 attached to the guard finger 7, and has a bottom surface adapted to skid along the ground surface.

The crop lifter apparatus 401 of FIG. 15 shows a crop lifter apparatus 401 of the type where the crop lifting finger 421 is attached at a fixed adjustable angle to a mounting bracket 405 attached to the guard finger 7, and where the front end 421F moves along the field slightly above the ground at a fixed position as illustrated in FIG. 3.

The lifting fingers 321, 421 each comprise a front finger portion 339, 439 attached to the mounting brackets 305, 405, and a rear finger portion 341, 441 movable from retracted positions 341A, 441A, where rear ends 321R, 421R of the rear finger portions 341, 441 are at a minimum distance from the front finger portions 339, 439, to an extended position 341B, 441B, where rear ends 321R, 421R of the rear finger portions 341, 441 are at a maximum distance from the front finger portions 339, 439.

In the illustrated apparatuses 301, 401, the rear finger portions 341, 441 telescope in and out of the front finger portions 339, 439 and are secured at a selected position by set screws 343, 443.

Thus the present invention provides a crop lifter apparatus of either the ground following skid type or the fixed position type where the angle of the lifting finger with respect to the header to which it is attached can be easily adjusted infinitely within a range to allow same to be mounted to a wide variety of headers, to address a wide variety of crop conditions, and to compensate for bent mounting brackets.

The length of the lifting finger can also be made adjustable so that when desired crop stalks can be lifted higher and supported farther rearward on the header.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A crop lifter apparatus for attachment to a harvest header, the apparatus comprising:
   a mounting bracket adapted at a rear portion thereof for attachment to a guard finger of the header;
   a groove with a cylindrical groove wall defined in a front portion of the mounting bracket such that an axis of the groove is oriented substantially horizontally and perpendicular to an operating travel direction of the header when the mounting bracket is attached to the header, and a lock bolt hole defined through the mounting bracket at a middle portion of the groove;
   a lifting finger support member having a proximate end with a cylindrical outer wall engaged in the groove, and defining a cylindrical lock aperture wherein an axis of the lock aperture substantially coincides with the axis of the groove;
   a lifting finger attached to the lifting finger support member;
   a slot defined in the outer wall of the proximate end of the lifting finger support member, the slot oriented substantially perpendicular to the axis of the lock aperture;
   a lock cylinder engaged in the lock aperture and having a cylindrical outer wall corresponding to an inner surface of the lock aperture;
   a lock bolt extending through the lock bolt hole and the slot and engaged in a threaded hole defined by the lock cylinder and tightened to secure the lifting finger support member to the mounting bracket at a selected finger angle.

2. The apparatus of claim 1 wherein the lifting finger support member comprises a flexible spring member extending forward and downward from the groove when the mounting bracket is attached to the header, and having a bottom surface adapted to skid along a ground surface, and wherein the lifting finger extends upward and rearward from a front portion of the spring member when the mounting bracket is attached to the header.

3. The apparatus of claim 2 wherein the proximate end of the spring member is rolled to form the cylindrical outer wall and the cylindrical lock aperture.

4. The apparatus of claim 1 wherein the lifting finger support member comprises a finger engagement device at an upper end thereof located above the groove when the mounting bracket is attached to the header, and a lifting finger engaged in the finger engagement device and extending downward and forward from the finger engaging device and rearward and upward from the finger engagement device when the mounting bracket is attached to the header.

5. The apparatus of claim 1 comprising a recess in the groove adjacent to the lock bolt hole such that outer portions of the mounting bracket adjacent to the recess are forced against the cylindrical outer wall of the proximate end of the support member when the lock bolt is tightened.

6. The apparatus of claim 1 wherein the selected finger angle is in a range between a maximum selected finger angle when the lock bolt is at a first end of the slot, and a minimum selected finger angle when the lock bolt is at an opposite second end of the slot.

7. The apparatus of claim 6 wherein the first and second ends of the slot are entirely within the groove at all selected finger angles.

8. The apparatus of claim 7 wherein the slot is the only perforation in the lifting finger support member.

9. The apparatus of claim 1 wherein the lifting finger is extendable, rearward such that a position of a rear end of the lifting finger with respect to the guard finger is adjustable rearward, while a front end of the lifting finger remains stationary.

10. The apparatus of claim 9 wherein the lifting finger comprises a front finger portion attached to the lifting finger support member, and a rear finger portion movable from a retracted position, where a rear end of the rear finger portion is at a minimum distance from the front finger portion, to an extended position, where a rear end of the rear finger portion is at a maximum distance from the front finger portion.

* * * * *